United States Patent [19]

Tsuji et al.

[11] 4,154,314
[45] May 15, 1979

[54] STEERING MECHANISM FOR VEHICLES

[75] Inventors: Kazuhiko Tsuji, Gojo; Hideaki Matsuyoshi, Sakai, both of Japan

[73] Assignee: Kubota Ltd., Osaka, Japan

[21] Appl. No.: 810,765

[22] Filed: Jun. 28, 1977

[51] Int. Cl.² ............................................. B62D 11/08
[52] U.S. Cl. ...................................... 180/6.2; 180/6.7; 192/13 R
[58] Field of Search ................ 180/6.2, 6.7; 192/13 R

[56] References Cited

U.S. PATENT DOCUMENTS

| 1,317,656 | 9/1919 | Turnbull | 192/13 R |
| 3,262,525 | 7/1966 | Ehlke et al. | 192/13 R |
| 3,797,619 | 3/1974 | Suzuki | 180/6.7 X |

*Primary Examiner*—John A. Pekar
*Attorney, Agent, or Firm*—Haseltine, Lake & Waters

[57] ABSTRACT

A steering mechanism for a vehicle comprising a first control member for operating a steering clutch and a steering brake on the left side of the vehicle, a second control member for operating a steering clutch and a steering brake on the right side of the vehicle, first link means connecting the first control member to the steering clutch and the steering brake on the left side, second link means connecting the second control member to the steering clutch and the steering brake on the right side, and a third control member and third link means connected thereto for simultaneously operating the left and right steering brakes. The first, second and third link means are made operative about vertical rod members to provide a flat compact mechanism. The third link means operates the steering brakes with a force increasing with the brake operating movement of the third control member to ensure effective braking action.

4 Claims, 2 Drawing Figures

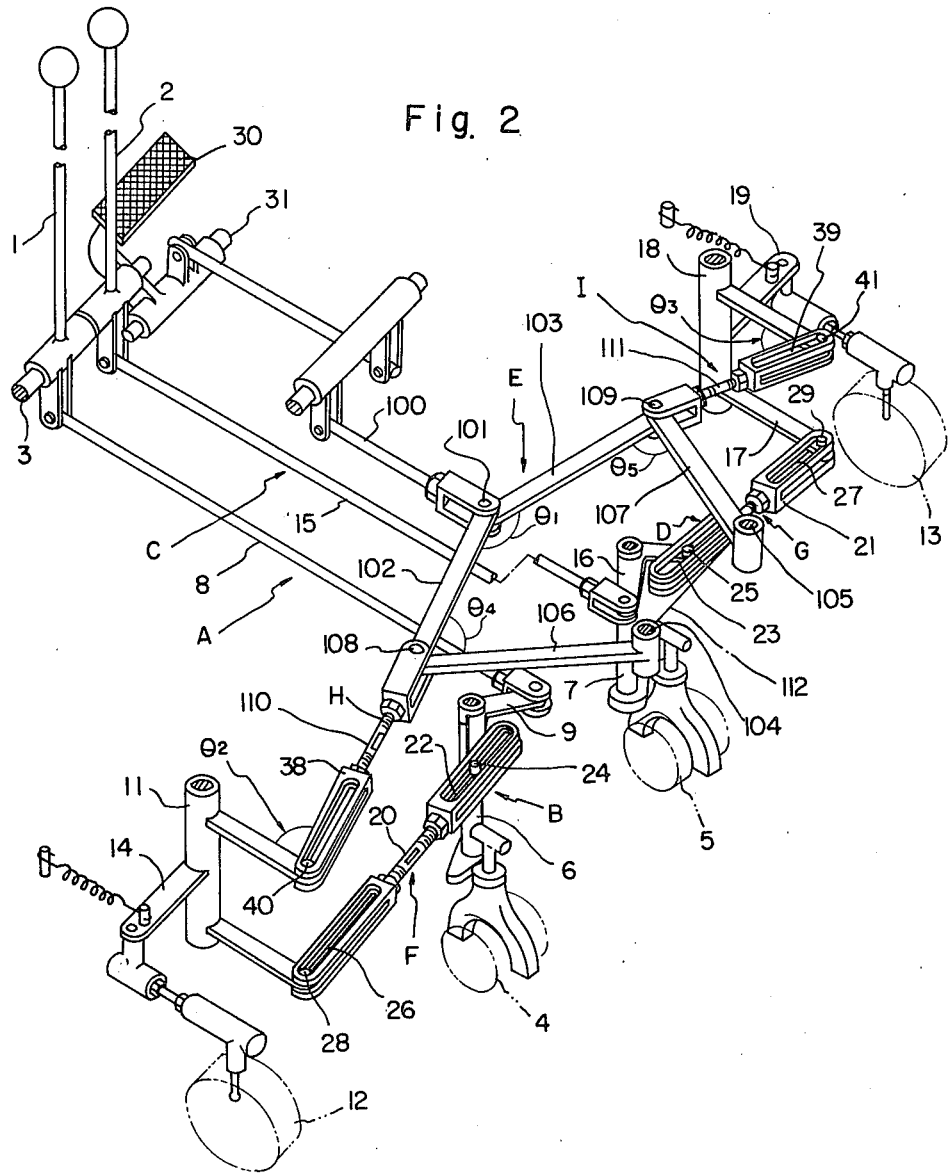

4,154,314

STEERING MECHANISM FOR VEHICLES

BACKGROUND OF THE INVENTION

The present invention relates to a steering mechanism for vehicles equipped with steering clutches and steering brakes on the left and right sides.

Steering mechanisms of this type are so designed that both the steering clutch and the steering brake on the left side can be operated by one control member, with those on the right side rendered similarly operative. Independently of this operating system, the left and right steering brakes are also adapted to be operated at the same time. It is already known to use link means in providing these operating systems. Generally, however, link means require a space for operation, are therefore not suited for installation in vehicles and will make the overall mechanism very bulky unless incorporated ingeniously in connection with the arrangement of the steering clutches and with the arrangement of the steering brakes. Furthermore, if link means of usual structure is used as adapted to be operated independently to actuate the steering brakes on the opposite sides, it has heretofore been impossible to afford a braking action with effectiveness which increases with the movement of the brake operating member.

SUMMARY OF THE INVENTION

An object of this invention is to provide a compact mechanism incorporating link means for operating the left and right steering clutches and steering brakes and another link means for operating the lift and right steering brakes only, the latter link means being adapted to produce a reliable braking effect when operating the opposite steering brakes alone.

To fulfill this object, the mechanism of this invention for steering vehicles comprises a first control member for operating a steering clutch on the left side of the vehicle and a steering brake on the left side, a second control member for operating a steering clutch on the right side of the vehicle and steering brake on the right side, first link means connecting the first control member to the steering clutch and the steering brake on the left side and adapted to operate these left steering clutch and brake by vertical rod members respectively, second link means connecting the second control member to the steering clutch and the steering brake on the right side and adapted to operate these right steering clutch and brake by vertical rod members respectively, a third control member for simultaneously operating the left and right steering brakes, and third link means connecting the third control member to the left and right steering brakes and adapted to operate the left and right steering brakes by the brake actuating vertical rod members and to give these vertical rod members a torque progressively increasing with the movement of the third control member.

Thus, the first, second and third link means are movable about the vertical rod members, in other words, these link means are movable along a horizontal plane, whereby it becomes possible to provide a compact mechanism of reduced height which is readily installable in a bottom portion of vehicles. Additionally, the third link means is adapted to give the brake actuating rod members a torque which progressively increases with the movement of the third control member. This assures effective operation of the steering brakes on the left and right sides.

Other objects and advantages of this invention will become apparent from the following description.

BRIEF DESCRIPTION OF THE DRAWINGS

FIG. 2 is a perspective view showing another steering mechanism embodying this invention.

DESCRIPTION OF THE PREFERRED EMBODIMENTS

Figure 1:
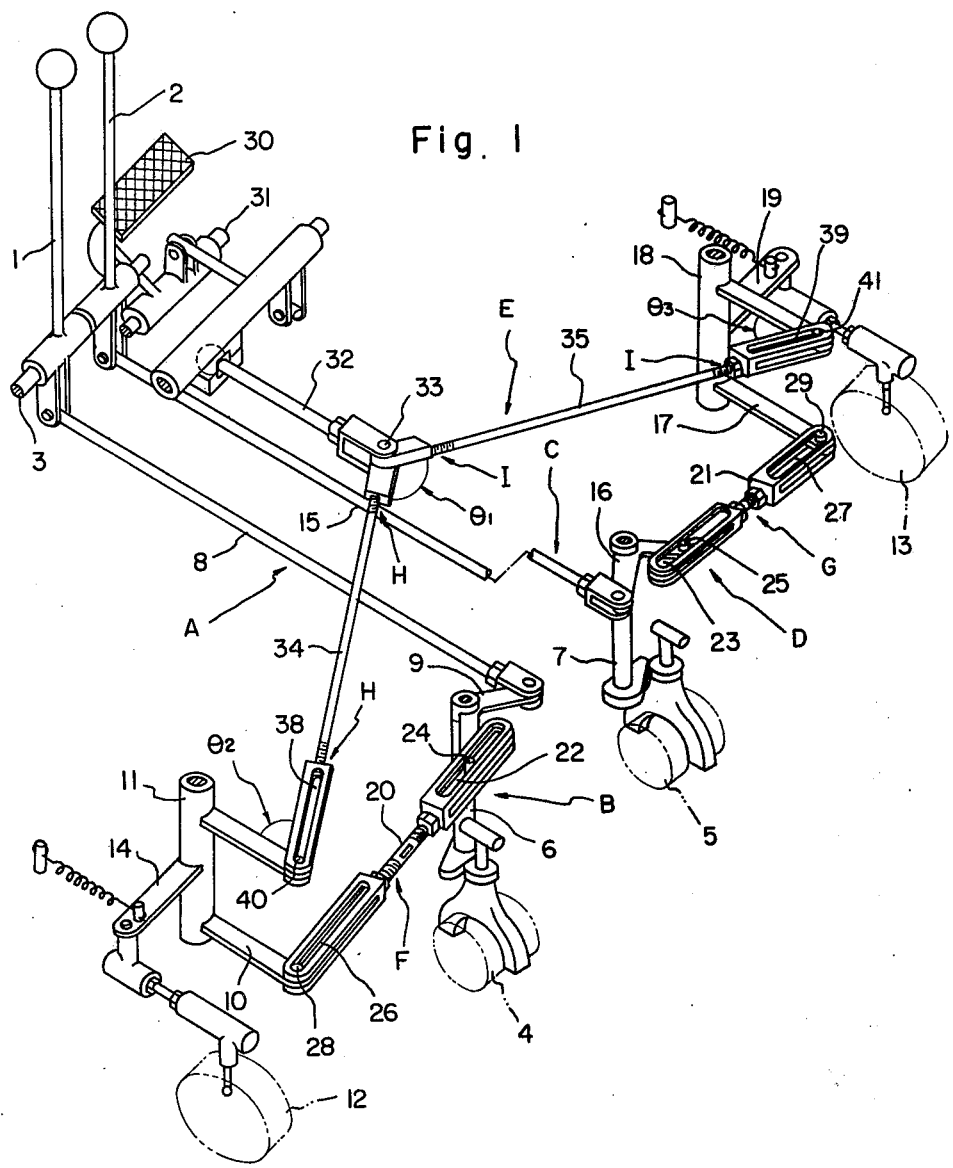
FIG. 1 is a perspective view showing a steering mechanism of this invention for use in vehicles.

With reference to FIG. 1 a steering mechanism of this invention will be described in detail. A first control member 1 and a second control member 2 on the left and right are turnably mounted on a lateral support 3 secured to the frame (not shown) of a vehicle. Left and right steering clutches 4, 5 are operated by shifters to permit or interrupt power transmission to the left and right wheels. Indicated at 6, 7 are vertical rod members for controlling the opposite steering clutchs 4, 5. The vertical rod members 6, 7, when turned, cause cam means to move the shifters. Steering brakes 12, 13 brake the left and right wheels. The first control member 1 is connected to the left steering clutch 4 by first link means A comprising a rod 8 pivoted at its one end to the lower end of the first control member 1 by a lateral pin, a bell crank 9 pivoted at its one end to the other end of the rod 8 by a vertical pin, operation delaying means B connected at its one end to the other end of the bell crank 9, an arm 10 connected to the other end of the delaying means B by a vertical pin, and a vertical rod member 11 having the arm 10 connected thereto. The bell crank 9 is secured at its midportion to the vertical rod member 6 for operating the left steering clutch 4. The vertical rod member 11 is provided with an arm 14 to operate the steering brake 12 for braking the left wheel. When turned, the rod member 11 applies a braking force. The second control member 2 is connected to the right steering clutch 5 by second link means C having exactly the same structure as the first link means A. Stated more specifically, the second link means C comprises a rod 15 pivoted to the second control member 2, a bell crank 16 pivoted to the rod 15, operation delaying means D connected to the bell crank 16, an arm 17 connected to the delaying means D, and a vertical rod member 18 having the arm 17 secured thereto. Like the left vertical rod member 11, the vertical rod member 18 has an arm 19 for operating the right steering brake 13.

The left and right operation delaying means B, D are so constructed that the first and second control members 1, 2, when moved, initially operate both the steering clutches 4, 5 only and, when further moved, operate both the steering brakes 12, 13. As illustrated specifically, the operation delaying means B, D comprise rods 20, 21 formed, each at one end of the rod, with slot 22, 23 having fitted therein pins 24, 25 projecting from the other ends of the bell cranks 9, 16 respectively, the pins 24, 25 being slidable within the slots 22, 23. Accordingly, the first and second control members 1, 2, when moved, first turn the bell cranks 9, 16, merely permitting the pins 24, 25 to slide in the slots 22, 23 without moving the rods 20, 21. This movement therefore turns the vertical rod members 6, 7 to which the bell cranks 9, 16 are secured, thereby operating the left and right steering clutches 4, 5 only. When the first and second control members 1, 2 are further continuously moved, the pins 24, 25 come into contact with the end portions of the rods 21, 22 defining the ends of the slots 22, 23, whereupon the pins 24, 25 start to move the rods 20, 21. The rods 20, 21 now pull the arms 10, 17 connected thereto, thereby turning the vertical rod members 11, 18 and operating the left and right steering brakes 12, 13. In this way, the operation delaying means B, D permit the first and second control members 1, 2 to disengage the steering clutches 4, 5 first and thereafter actuate the steering brakes 12, 13 during the continuous movement of the control members 1, 2 in one direction. The other ends of the rods 20, 21 are similarly formed with slots 26, 27. The arms 10, 17 secured, each at one end thereof, to the vertical rod members 11, 18 have pins 28, 29 projecting from the other ends thereof. The pins 28, 29 are engaged in the slots 26, 27. When the left and right steering brakes 12, 13 only are operated by the third link means to be described below, this structure serves to keep the opposite steering clutches 4, 5 free of the brake operating action. Furthermore, the rods 20, 21 include adjusting means F, G for adjusting their operative relations to the left and right steering clutches 4, 5 and brakes 12, 13. Known turnbuckles are useful as the means F, G. The adjustment thus afforded assures reliable brake and clutch operations.

Indicated at 30 is a third control member, which, like the first and second control members, is turnably mounted on a lateral support 31 secured to the frame of the vehicle. The third control member 30 is connected to the left and right steering brakes 12, 13 by third link means E. The third link means E comprises a rod 32 coupled at its one end to the third control member 30, two rods 34, 35 pivoted to the other end of the rod 32 by a vertical pin 33, and arms 36, 37 secured, each at one end thereof, to the vertical rod members 11, 18 respectively and pivoted at their other ends to the other ends of the two rods 34, 35 turnably about vertical axes. The third link means E is so constructed that the two rods 34, 35 connected to the rod 32 form an obtuse angle $\theta_1$ between the rods 34, 35 when the third link means E is in its nonoperative position. The third link means E is also so designed that acute angles $\theta_2$, $\theta_3$ are formed between the two rods 34, 35 and the arms 36, 37 respectively when the third link means E is similarly in its nonoperative position. The angles $\theta_1$, $\theta_2$, $\theta_3$, thus set enable the third link means E to give a progressively increasing torque to the vertical rod members 11, 18 for operating the opposite steering brakes 12, 13 when the third control member 30 is operated. This assures that the rod members 11, 18 will operate the steering brakes 12, 13 with a great force in the final stage of the operation. The rods 34, 35 are provided at their connections to the arms 36, 37 with slots 38, 39 having fitted therein vertical pins 40, 41 on the arms 36, 37. This arrangement renders the third link means E free of the influence to be otherwise exerted thereon when the first and second link means A, C are operated. The two rods 34, 35 include adjusting means H, I for the adjustment of their lengths so as to properly operate the steering brakes 12, 13. Turnbuckles are used as the means H, I.

The embodiment shown in FIG. 2 will now be described. The members shown in FIG. 2 and serving the same functions as those in FIG. 1 are referred to by the same reference numerals and characters and will not be described in detail. The embodiment shown in FIG. 2 differs from that of FIG. 1 in the specific construction of the third link means E. The third link means E includes five link members which are connected together. The link means E comprises a rod 100 coupled to the third control member 30, two rods 102, 103 connected each at one end thereof to the rod 100 by a vertical pin 101, pivotal arms 106, 107 pivoted each at one end thereof to the other ends of the rods 102, 103 by vertical pins 108, 109 and also pivoted at their other ends to vertical members 104, 105 secured to the frame of the vehicle, and rods 110, 111 pivotably supported by the pins 108, 109. A frame portion 112 of the vehicle serves as a fixed member of the five-membered link means. Like the embodiment shown in FIG. 1, the angles $\theta_1$, $\theta_2$, $\theta_3$ are an obtuse angle, an acute angle and an acute angle respectively. The link members are so arranged that the angle $\theta_4$ between the rod 102 and the pivotal arm 106, and the angle $\theta_5$ between the rod 103 and the pivotal arm 107 are acute angles when the third link means E is in its nonoperative position. The arrangement including the pivotal arms 106, 107, the rod 102 pivoted to another rod 110, and the rod 103 similarly pivoted to another rod 111 permits the rods 110, 111 to be moved by the operation of the third control member 30 initially a great amount and subsequently a small amount relative to the amount of the movement of the control member 30, also allowing the rods 110, 111 to pull the arms 36, 37 with a great force, whereby the left and right steering brakes 12, 13 can be operated rapidly and properly.

The first to third link means can be modified variously provided that they are operative about vertical axes and that the third link means gives a brake operating force which increases with the movement of the control member operated.

We claim:

1. A steering mechanism for a vehicle, employing a first control member connected to first link means pivotally connected to an arm formed on a vertical rod member for operating a left steering clutch; a left side operation delaying means being operable through said first link means is pivotally connected to an arm of a vertical rod member for operating a left side steering brake in delayed action; a second control member connected to second link means pivotally connected to an arm of another vertical rod member for operating a right steering clutch, a right side operation delaying means being operable through said second link means is pivotally connected to an arm of a vertical rod member for operating a right side steering brake in delayed action; and a third control member connected to third link means for simultaneously operating said left and right side steering brakes, wherein: said third link means comprises, rod means connected at a first end thereof to said third control member, two rods pivoted at a second end of said rod means at an obtuse angle between the rods when in a non-operative position, and being pivotally connected to a respective arm on said rod members for operating said left side and right side steering brakes, having acute angles formed between said arms and said rods respectively in a non-operative position.

2. A mechanism as defined in claim 1 wherein: each of said operation delaying means comprises a rod pivotally and slidably mounted with respect to said arms on said respective left side and right side vertical brake operating rod members and pivotally and slidably mounted with respect to arms on said respective left side and right side vertical clutch operating rod members.

3. A mechanism as defined in claim 2 wherein: said first, second and third link means are provided with respective adjusting means for adjustment of their respective operative relationships to said left and right steering clutches and said left and right hands steering brakes.

4. A steering mechanism for a vehicle, employing a first control member connected to first link means pivotally connected to an arm formed on a vertical rod member for operating a left steering clutch; a left side operation delaying means being operable through said first link means is pivotally connected to an arm of a vertical rod member for operating a left side steering brake in delayed action; a second control member connected to second link means pivotally connected to an arm of another vertical rod member for operating a right steering clutch, a right side operation delaying means being operable through said second link means is pivotally connected to an arm of a vertical rod member for operating a right side steering brake in delayed action; and a third control member connected to third link means for simultaneously operating said left and right side steering brakes, wherein: said third link means comprises a rod coupled to said third control member, two rods connected each at one end thereof to said rod by means of a vertical pin, pivotally mounted arms pivoted each at one end thereof, to the other ends of said two rods by vertical pins and being pivotally mounted at their other ends to vertical members secured to the frame of said vehicle, and further rods pivotably supported each at one end thereof, to said two rods by said pins and being pivoted at their other ends to said arms of said vertical members for said right and left steering brakes to thereby form an obtuse angle between said two rods, said arm of said vertical rod member for said right steering brake and one of said two rods, and said arm of said vertical rod member for left steering brake and the other of said two rods, and each angle formed respectively between one of said two rods and said arm pivoted to one of said vertical members secured to the frame of the vehicle, and the other rod of said two rods and said further rod pivoted to the other of said vertical members is an acute angle when said third link means is in a non-operative position.

* * * * *